United States Patent [19]
Sturm et al.

[11] 3,839,337
[45] Oct. 1, 1974

[54] SUBSTITUTED AZABICYCLOALKANES

[75] Inventors: Elmar Sturm, Arlesheim; Brigitta Von Bredow; Christian Vogel, both of Benningen, all of Switzerland

[73] Assignee: Ciba-Geigy Corporation, Ardsley, N.Y.

[22] Filed: Jan. 10, 1972

[21] Appl. No.: 216,785

[30] Foreign Application Priority Data
Jan. 14, 1971   Switzerland............................ 552/71

[52] U.S. Cl....... 260/283 S, 260/283 R, 260/326.12, 71/94, 71/95
[51] Int. Cl............................................. C07d 33/02
[58] Field of Search ...................... 260/283 S; 71/94

[56] References Cited
UNITED STATES PATENTS

| | | | |
|---|---|---|---|
| 1,873,934 | 8/1932 | Lommel............................ | 260/283 S |
| 3,198,786 | 8/1965 | Tilles ................................ | 260/239 |
| 3,275,628 | 9/1966 | Brown .............................. | 260/283 S |
| 3,282,978 | 11/1966 | Swakon............................. | 260/279 |
| 3,305,576 | 5/1967 | D'Amico.......................... | 260/268 C |
| 3,557,194 | 1/1971 | Fuchsman......................... | 260/283 S |
| 3,639,404 | 2/1972 | Richter............................. | 260/283 S |
| 3,661,916 | 5/1972 | Sturm et al. ..................... | 260/293.54 |
| 3,705,165 | 12/1972 | Sturm .............................. | 260/293.54 |
| 3,776,912 | 12/1973 | Sturm .............................. | 260/283 S |

OTHER PUBLICATIONS
Liushits et al. in Chem. Abstr. Vol. 46, Col. 5043, (1952).

*Primary Examiner*—Donald G. Daus
*Attorney, Agent, or Firm*—Harry Falber; Frederick H. Rabin

[57] ABSTRACT

Substituted azabicycloalkanes of the formula I

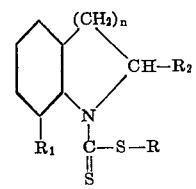

wherein R represents an alkyl radical containing one to four carbon atoms, an alkenyl radical containing three to four carbon atoms and which may be substituted by chlorine, $R_1$ and $R_2$ each represents hydrogen or the one represents methyl and the other represents hydrogen, and $n$ is the number 1 or 2, are useful for influencing the growth of plants, e.g., for combating weeds.

3 Claims, No Drawings

SUBSTITUTED AZABICYCLOALKANES

The present invention relates to substituted azabicycloalkanes, processes for their manufacture, also to selective herbicidal agents which contain said substituted azabicycloalkanes as active substances and to processes for combating weeds and grass-like weeds which comprise the use of the new active substances or of agents that contain them.

The term "azabicycloalkanes" is used here and hereinafter to denote 2-azabicyclo[4,4.0]-decanes (decahydroquino-lines) and 7-azabicyclo[4.3.0]-nonanes (octahydroindoles).

The substituted azabicycloalkanes according to the invention correspond to the formula I:

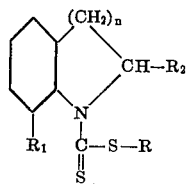

I wherein R represents an alkyl radical containing one to four carbon atoms, an alkenyl radical containing three to four carbon atoms and which may be substituted by chlorine, $R_1$ and $R_2$ each represent hydrogen or the one represents methyl and the other hydrogen, and $n$ is the number 1 or 2.

Alkyl radicals represented by R are straight-chain or branched radicals, that is to say the methyl, ethyl, n-propyl, isopropyl, n-butyl, isobutyl, sec.butyl and tert. butyl radicals.

The straight-chain or branched alkenyl radicals containing three to four carbon atoms include the allyl, 2-buten-yl, 3-buten-yl and the methylallyl radical.

Of the alkenyl radicals substituted by chlorine there be cited in particular the 2-chloro- and the 3-chloroallyl radical.

The substituted azabicycloalkanes of the formula I are obtained according to the invention by reacting an azabicycloalkane of the formula II

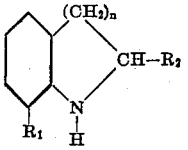

(II)

in the presence of an acid binding agent, with carbon disulphide ($CS_2$) and subsequently with an alkylating or alkenylating agent. Suitable acid binding agents are those cited below, preferably alkali metal hydroxides. Suitable alkenylating agents are primarily alkyl halides and alkenyl halides, also dialkylsulphuric acid esters and alkyl esters of toluene-sulphonic acids. According to a further process of the present invention, the new substituted azabicycloalkanes of the formula I are obtained by reacting an azabicycloalkane of the formula II either with a thiocarbonic acid halide of the formula III

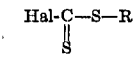

(III)

or with the constituent components of such a thiocarbonic acid halide, namely thiophosgene and an alkali metal salt of a mercaptan of the formula IV

R—SH (IV)

in the presence of an acid binding agent. In the formulae II to IV, R, $R_1$, $R_2$ and n have the meanings as given under formula I, and Hal in the formula III denotes chlorine or bromine. It is advisable to carry out the reactions in a solvent or diluent which is inert towards the reactants. The nature of the solvent is very largely determined by the acid binding agent used in the reaction. If organic bases such as tertiary amines are used, it is advisable to use organic solvents also. In the case of organic bases, water and aqueous mixtures of organic solvents which are miscible with water are suitable. In general, the following tertiary amines may be used as acid binding agents: pyridine and pyridine bases, triethylamine etc. The respective azabicycloalkane of the formula II, used in the reaction in excess, may likewise be used as acid binding agent. Among inorganic bases there may be considered the hydroxides and carbonates of alkaline and alkaline earth metals, preferably sodium hydroxide, sodium or potassium carbonate, as well as hydroxides and carbonates of lithium, barium strontium, magnesium, as well as quaternary ammonium compounds which react as bases in the presence of water, for example, tetramethyl ammonium hydroxide, etc.

As solvents there may be used: aliphatic and aromatic hydrocarbons and halogenated hydrocarbons, such as benzene, toluene, xylenes, petroleum ether, chlorobenzene, methylene chloride, chloroform, carbon tetrachloride, ether and tetrahydrofuran. solvents such as dialkyl ether, tetrahydrofuran, Suitable solvents which are miscible with water are alkanols, ketones etc.

The reactions according to the invention of a substituted azabicycloalkane of the formula II according to one of the indicated methods to give compounds of the formula I are carried out at temperatures of −20°C to +100°C, preferably between 0°C and +30°C.

Some of the azabicycloalkanes of the formula II are known and some are new compounds. The new compounds are manufactured in known manner by hydrogenating the corresponding aromatic heterocycles at 100°–180°C and 100–200 gauge pressure, in aqueous emulsion and in the presence of noble metal catalysts, for example, ruthenium/carbon catalysts.

The starting compounds comprised by the formula II are present in two isometric forms: in the cis- and in the trans-configuration. In the case of the 2-azabicyclo[4.4.0]-decane (decahydroquinolines), with $R_1$ and $R_2$ representing hydrogen in the formula II, the cis- and trans-isomers are easily isolated and lead to two series of compounds of the formula I with cis- and trans-configuration.

The new substituted azabicycloalkanes of the formula I possess excellent herbicidal properties and are suitable partly as general herbicides and partly for combating weeds and grass-like weeds in rice cultures (water and dry rice cultures). Varieties of weeds which are difficult to combat in rice cultures are attacked and destroyed by compounds of the formula I. Examples of such weeds in water rice cultures are: *Echinochloa sp., Eleocharis sp., Monochoria, Sagittaria, Panicum sp., Cyperaceen, Rotala, Linderia, Vandellia, Paspalum sp.,* etc.: and in dry rice cultures likewise *Echinochloa sp.,*

*Digitaria sp., Brachiaria sp., Sida sp., Cyperaceen, Acanthosperum sp.* etc. Since the active substance gradually destroy the undesirable plants and thus do not have any excessively deleterious effect on the oxygen balance and on the balance of nature, they are very well suited for application in water rice cultures. Moreover, the active substances possess a broad activity spectrum against various water weeds, for example against emersed plants, aquatic plants with and without floating leaves, submersed plants, algae etc.

Both the cis- and the trans-azabicycloalkanes of the formula I as well as mixtures of both forms are heroicidally active.

Some of the new azabicycloalkanes of the formula I possess in addition a fungicidal action on numerous phytopathogenic fungi. Thus, for example, mildew fungi, such as powdery mildew of cucumbers (*Erysiphe cichoriacearum*), powdery mildew of apple (*podosphaera leucotricha*), rose mildew (*Sphaerotheca pannosa*), powdery mildew of grasses and cereals (*Erysiphe graminis*) and downy mildew fungi, such as the pathogen of potato blight (*Phytophthora infestans*), downy vine mildew (*Plasmophora viticola*), also leaf spot pathogens, such as the pathogen of the tomato blight (*Alternaria solani*), celery blight (*Septoria spicola*) and rust fungi, such as bean rust (*Uromyces appendiculatus*), also the difficulty controllable common grey mould (*Botritis cinerea*) etc., are destroyed or inhibited in their growth by application of the new active substances.

The broad activity spectrum of the new substituted azabicycloalkanes of the formula I also makes it possible to use them in the important task of combating weeds and grass-like weeds in the area surrounding the rice cultures, for example ditches, canal beds, dams etc. Not only the cited grass-like weeds occuring in rice cultures but also other grass-like and broad-leaved weeds are destroyed by these active substances. The active substances may be used for destroying a crop of weeds which has already sprouted when preparing the rice beds and after the crop plants have emerged. Both rice which is planted in water and that which is planted dry do not suffer any damage when the new substituted 2-azabicycloalkanes are applied in the conventional concentrations, and damage which is very largely reversible when high rates of application are used. The rates of application vary and depend on the time of application; they are between 0.5 and 6 kg of active substance per hectare, preferably 4 kg per hectare, in the case of application before the plants have germinated. Rates of application of 10–30 kg of active substance per hectare are used to totally destroy the entire crops of weeds, for example, on the fallow land neighbouring on the cultivated areas and to determine the general herbicidal activity. The crop rotation important for the rice culture may proceed on application of the new active substances without any detrimental effects.

The azabicycloalkanes of the formula I may also be used furthermore as growth regulators, for example, for defoliating, delaying blossoming etc. The new compounds influence the vegetative plant growth and germination power and promote fruit development and the evolution of abscission tissues. The development of side shoots in various species of plants is very substantially diminished. The new compounds also have a promotor action, for example, the latex flow in *Hevea brasiliensis* is promoted. As experiments have shown, the rooting of seedlings and cuttings and also the tuber formation in potatoes are favourably influenced. The germination power of seeds, for example of seed potatoes and legumes, is promoted on the use of low and prevented on the use of high concentrations.

Both effects are of economic importance. In the case of many ornamental and useful plants it is possible to control the term of blossoming and the number of blossoms. If all shrubs blossom simultaneously, they can be harvested within a comparatively short time.

Experiments also showed that a thinning out of blossoms and fruit occurred in fruit trees. Furthermore, the ripening and colouring of fruit, for example, in the case of apples, peaches, tomatoes, bananas and pineapples, were accelerated and improved. The abscission of fruit and leaves is greatly facilitated by the formation of abscission tissue — a factor which is of great economic importance in the mechanical harvesting of, for example, citrus fruit or cotton.

The herbicidal agents are manufactured by mixing the active substances with suitable carriers and/or dispersing agents. In order to broaden the activity spectrum it is possible to add to these agents still other herbicides, for example from the series of the triazines, such as halogeno-diamino-s-triazines, alkoxy- and alkylthio-diamino-s-triazines, triazoles, diazines, such as uraciles, aliphatic carboxylic acids and halogenocarboxylic acids, halogenated benzoic acids and phenylacetic acids, aryloxyalkanecarboxylic acids, hydrazides, amides, nitriles, esters of such carboxylic acids, carbamic acids and thiocarbamic acids, ureas etc.

The following examples illustrate the processes for the manufacture of new substituted 2-azabicycloalkanes of the formula I.

EXAMPLE 1

A solution of 4.5 g of potassium hydroxide in 50 ml of water is added to a solution of 11.1 g of cis-decahydroquinoline in 100 ml of 50 percent aqueous alcohol and 6.1 g of carbon disulphide is added dropwise to the mixture while stirring and cooling at 0°–5°C. After stirring the reaction mixture overnight at 5°–10°C, 8.7 g of ethyl bromide is added all at once and stirring is continued for 8 hours at room temperature. The reaction mixture is then diluted with 200 ml of water and the oil which has precipitated is taken up in methylene chloride. After drying the methylene chloride solution and evaporating the solvent a yellow oil is obtained which is freed from volatile impurities under a high vacuum over the course of 3 hours. Yield: 17 g (85 percent of theory) of 1-(ethylthio-thio-carbonyl)-cis-decahydroquinoline ($n_D^{20} = 1.5997$).

EXAMPLE 2

A solution of 12 g of trans-decahydroquinoline in 100 ml of ethanol is treated with a solution of 3.5 g of sodium hydroxide in 50 ml of water, the mixture cooled to 0°C and 6.6 g of carbon disulphide is added dropwise thereto while stirring. The reaction mixture is stirred for 1 hour at 5°–15°C, then 6.9 g of allyl chloride is added all at once and stirring is continued for 15 hours at room temperature. 300 ml of water are poured into the reaction mixtures and the oil which has precipitated is extracted with methylene chloride. The dried solution is concentrated to about 30 ml volume and chromatographed over a column containing 75 g of aluminium oxide "Woelm"(activity level III). The eluate yields 8.6 g of a yellow oil which can be distilled at 200°C oil bath temperature and 0.1 Torr in a bulb tube distilling apparatus.

Yield: 8.0 g (72 percent of theory) of 1-(allylthio-thiocarbonyl)-trans-decahydroquinoline in the form of a colorless viscous oil.

EXAMPLE 3

12.5 g of octahydroindole are dissolved in 150 ml of 50 percent aqueous ethanol and 50 ml of sodium hydroxide solution are added. To the stirred and cooled solution are added dropwise at 0°–5°C 7.6 g of carbon disulphide and stirring is continued for 30 minutes at 15°–20°C. To the mixture are then added 11.5 g of 2,5-dichloro-propene and the whole mixture is stirred for 24 hours at room temperature. The bulk of the ethanol is removed in vacuo and the oil which has precipitated is taken up in ether. The ether solution is dried and the solvent is evaporated in vacuo, then the residual brownish oil is chromatographed over aluminium oxide "Woelm" (activity level III) and eluted with benzene/methylene chloride (10:1). The eluate is evaporated in vacuo and the resulting yellow oil is dried under 0.1 Torr to yield 21 g (76 percent of theory) of 1-(2-chloroallylthio-thio-carbonyl)-octahydroindole (refractive index $n_D^{20} = 1.6107$).

The following compounds were manufactured in analogous manner to these examples.

The herbicidal activity of the new compounds is indicated by means of the following tests:

I. Pre-emergence Test

The active substance in the form of a 10 percent powder concentrate is worked into soil in a concentration of 30 kg of active substance per hectare. The thus prepared soil is put into seed dishes in which the following test plants are sown: Italian millet (*Setaria italica*), mustard (*Sinapis alba*), oats (*Avena sativa*), rye grass (*Lolium perenne*) and vetch (*Vicia sativa*).

The dishes are then kept in a greenhouse at 20°–24°C and 70 percent relative atmospheric humidity and in daylight.

The evaluation of the test takes place after 20 days and according to the follwing key:
9 = undamaged plants = control
1 = destroyed plants
8–2 = intermediate stages of damage Table I

| | | |
|---|---|---|
| 4. | 1-(methylthio-thiocarbonyl)-cis-decahydroquinoline | $n_D^{20} = 1,6082$ |
| 5. | 1-(isopropylthio-thiocarbonyl)-cis-decahydroquinoline | $n_D^{20} = 1,5882$ |
| 6. | 1-(allylthio-thiocarbonyl)-cis-decahydroquinoline | $n_D^{20} = 1,6052$ |
| 7. | 1-(3-cis-chloroallylthio-thiocarbonyl)-cis-decahydroquinoline | $n_D^{20} = 1,6154$ |
| 8. | 1-(2-chloro allylthio-thiocarbonyl)-cis-decahydroquinoline | $n_D^{20} = 1,6093$ |
| 9. | 1-(ethylthio-thiocarbonyl)-trans-decahydroquinoline | $n_D^{20} = 1,5949$ |
| 10. | 1-(isopropylthio-thiocarbonyl)-trans-decahydroquinoline | $n_D^{20} = 1,5845$ |
| 11. | 1-(3-cis-chloroallylthio-thiocarbonyl)-trans-decahydro quinoline | $n_D^{20} = 1,6112$ |
| 12. | 1-(2-chloroallylthio-thiocarbonyl)-trans-decahydroquinoline | $n_D^{20} = 1,6041$ |
| 13. | 1-(n-propylthio-thiocarbonyl)-2-methyl-decahydroquinoline | $n_D^{20} = 1,5842$ |
| 14. | 1-(allylthio-thiocarbonyl)-octahydroindole | $n_D^{20} = 1,6052$ |
| 15. | 1-(3-trans-chloroallylthio-thiocarbonyl)-octahydroindole | $n_D^{20} = 1,6155$ |
| 16. | 1-(3-cis-chloroallylthio-thiocarbonyl)-octahydroindole | $n_D^{20} = 1,6142$ |
| 17. | 1-(allylthio-thiocarbonyl)-2-methyl-octahydroindole | $n_D^{20} = 1,5937$ |
| 18. | 1-(2-chloroallylthio-thiocarbonyl)-2-methyl-octahydroindole | $n_D^{20} = 1,6003$ |
| 19. | 1-(3-trans-chloroallylthio-thiocarbonyl)-2-methyl-octahydroindole | $n_D^{20} = 1,6068$ |
| 20. | 1-(p-propylthio-thiocarbonyl)-cis-decahydroquinoline | b.p. 132–140/ 0,04 Torr |
| 21. | 1-(n-propylthio-thiocarbonyl)-trans-decahydro-quinoline | b.p. 125–130/ 0,04 Torr |
| 22. | 1-(3-cis-chloroallylthio-thiocarbonyl)-2-methyl-octahydroindole | $n_D^{20} = 1,6062$ |
| 23. | 1-allylthio-thiocarbonyl)-2-methyl-decahydro-quinoline | $n_D^{20} = 1,5981$ |
| 24. | 1-(allylthio-thiocarbonyl)-8-methyl-decahydro-quinoline | $n_D^{20} = 1,5970$ |
| 25. | 1-(isopropylthio-thiocarbonyl)-8-methyl-decahydro-quinoline | b.p. 133–135°/ 0,04 Torr |
| 26. | 1-(2-buten(Δ2) ylthio-thiocarbonyl)-octahydroindole | $n_D^{20} = 1,5952$ |
| 27. | 1-(Ethylthio-thiocarbonyl)-2-methyl-octahydroindole | b.p. 122–123°/ 0,04 Torr |
| 28. | 1-(n-butylthio-thiocarbonyl)-7-methyl-octahydroindole | b.p. 193–198°/ 0,04 Torr |

TABLE II

| Active Substance Example No. | Italian millet (*Setaria italica*) | Mustard (*Sinapis alba*) | Oats (*Avena sativa*) | Rye grass (*Lolium perenne*) | Vetch (*Vicia sativa*) |
|---|---|---|---|---|---|
| 1 | 2 | 7 | 8 | 2 | 7 |
| 4 | 2 | 6 | 4 | 2 | 7 |
| 6 | 2 | 8 | 7 | 2 | 8 |
| 10 | 1 | 3 | 7 | 1 | 7 |

The 10 percent powder concentrate has the following composition: 10 parts of active substance, six-tenths parts of sodium dibutyl-napthalenesulphonate, one part of naphthalene-sulphonic acid/phenolsulphonic acid/-formaldehyde concentrate (3:2:1), 10 parts of sodium aluminium silicate and 78.4 parts of kaolin.

II. Selectiva pre-emergence test with sown test plants

Immediately after sowing the test seeds in seed dishes, the active substances are applied in the form of an aqueous suspension (obtained from a 25 percent wettable powder) to the surface of the soil. The seed dishes are then kept at 22°–25°C and 50–70 percent relative atmospheric humidity in day-light.

The evaluation takes place after 28 days and according to the above mentioned key. The following test plants are sown:

| | |
|---|---|
| rice (dry) | |
| rice (in water) | (Oryza cryzoides) |
| wheat | (Triticum vulgare) |
| soya | (Glycine hispida) |
| cotton | (Gossypium) |
| maize | (Zea mais) |
| Italian rye grass | (Lolium perenne) |
| Italian millet | (Setaria italica) |
| coocksfoot panicum | (Echinochloa crus galli) |
| a) dry | |
| b) in water | |
| rough meadow grass | (Poa trivialis) |
| slender foxtail | (Alopecurus myosuroides) |
| crabgrass | (Digitaria sanguinalis) |

Table III

Selective *ital.*
Growth of the sown plants after 4 weeks

| Active Substance Example No. | Conc. kg/ha | Cultivated Plants | | | | | | Weeds/Grass-like Weeds | | | | | |
|---|---|---|---|---|---|---|---|---|---|---|---|---|---|
| | | Rice dry | Rice in water | Wheat | Soya | Cotton | Maize | Lolium multifl. | Setaria ital. | Echinochloa dry | Echinochloa in water | Poa triv. | Alope curusmyos. | Digitaria sanquin. |
| 1 | 4 | 8 | 9 | 7 | 7 | 8 | 8 | 2 | 2 | 1 | 2 | 1 | 1 | 1 |
| | 2 | 8 | 9 | 9 | 7 | 8 | 8 | 3 | 3 | 2 | 3 | 1 | 2 | 2 |
| | 1 | 8 | 9 | 9 | 7 | 9 | 9 | 6 | 7 | 5 | 7 | 1 | 8 | 4 |
| 18 | 4 | 9 | 8 | 9 | 9 | 9 | 9 | 3 | — | 2 | 2 | 1 | — | 1 |
| | 2 | 9 | 9 | 9 | 9 | 9 | 9 | 3 | — | 2 | 2 | 1 | — | 2 |
| | 1 | 9 | 9 | 9 | 9 | 9 | 9 | 4 | — | 2 | 3 | 1 | — | 3 |

III. Inhibition of growth in height of grasses

A mixture of grasses, consisting of Lolium perenne (20 percent), Poa pratensis (23 percent), Festuca ov. (10 percent) and Festuca rubra (47 percent), is cultivated for 4 months in seed dishes and cut once weekly. The freshly cut grass, about 1.5 cm high, is then treated with aqueous of aqueous-acetonic active substance solutions. The grass is then kept at 25°C and 65 percent relative atmospheric humidity under 15,000 lux. The growth in height is evaluated 4 weeks after the application of the active substances.

The decrease in the growth in height produced by the active substance in various rates of application is indicated in the table below, the rating being as follows:

6 = no action (as untreated grass)
5 = about 16 % inhibition of the growth in height
4 = about 35 % do.
3 = about 50 % do.
2 = about 66 % do.
1 = about 85 % do.

Table IV

| Active Substance Example No. | Concentration kg/ha | Lolium per | Festuca ru. | Festuca ov. | Poa prat. |
|---|---|---|---|---|---|
| 1 | 10 | 3 | 5 | 4 | 4 |
| | 5 | 3 | 6 | 5 | 4 |
| 13 | 10 | — | — | — | 3 |
| | 5 | — | — | — | 4 |

IV. The fungicidal action of the new compounds is indicated by the following tests:

Action against Botrytis cinerea on Vicia faba (broad beans)

Well-developed, uniformly large leaves of *Vicia faba*, which are sprayed dripping wet with a broth (0.1 percent content of active substance) prepared from active substance formulated as wettable powder, are placed three at a time in Petri dishes in which moistened filter paper has been laid. After the layer of spray has dried off, they are infected with a freshly prepared spore *suspension* of the fungus. After the leaves have been kept for 1–2 days in a humid atmosphere at 18°–20°C, there appear on them black, initially dot shaped specks which rapidly spread. The number and size of the infected areas serve as yardstick for evaluating the activity of the test substance. In the following tables V and VI the ratings denote:

10 = inactive, some infection as untreated control plants,
9–1 = decrease in attack according to linear evaluation,
0 = no attack.

Table V

| Compound Example No. | Infection |
|---|---|
| 5 | 0 |
| 6 | 1 |

Action against powdery mildew on young apple trees

Apple tree cuttings of the type MM 111 are reared in a greenhouse. When three to four leaves have formed on each of the developing lateral shoots the test products, in the form of a 10 percent wettable powder, are sprayed in concentrations from 0.1 to 0.05 percent of active substance on each of four young trees until the leaves are dripping wet. After the layer of spray has dried, the leaves are uniformly sprayed on the topside with a spore suspension of the fungus Podos-*phaera leucotricha* (Ell et Ev.) Salm. The plants are kept at 20°C in the greenhouse, and 7 to 14 days after the first treatment are sprayed again with the test products, as described hereinabove. The plants are kept in the greenhouse at 20°C and about 90 percent atmospheric humidity until the symptoms of disease become visible on the untreated control plants. The tests are evaluated about 10–12 days after the last fungicidal treatment by ascertaining the number of infections per leaf and calculating an average value for each product and concentration from the resulting individual values.

Action against downy mildew on views

Vine cuttings of the variety "Chasselas" are reared in a greenhouse. When they are in the 10 leaf stage the plants are sprayed with the test substances, as described above. Three plants are used for each substances and concentration. After the spray layer has dried, the plants are uniformly infected on the underside of the leavers with the spore suspension of Plasmopara viticola (Bert. et Curt.) (Berl. et DeToni). The plants are then put into a spray chamber in which the surface of the plants is kept moist for 7–8 days by atomisation of water, without any water dripping off. The symptoms of disease are then visible on the untreated control plants. The number of infections on each leaf is then determined and an average value for each concentration is ascertained from the resulting values.

Table VI

| Active Substance No. | Infection with *Podosphaera leucotricha* Powdery Mildew (apple) | Infection with *Plasmopara viticola* Downy mildew (vine) |
|---|---|---|
| 2 | 1 | 0 |
| 7 | 1 | 0 |

The other substances were tested in like manner and showed a similar action. The herbicidal agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms
dusts, tracking agents, granules, coated granules, impregnated granules and homogeneous granules.
Liquid forms:
a. active substances which are dispersible in water: wettable powders, pastes, emulsions;
b. solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

The particle size of the carriers for dusts is advantageously up to about 0.1 mm, for tracking agents from about 0.075 to 0.2 mm, and the granules 0.2 mm or larger.

The concentrations of active substance in the solid preparations are from 0.5 to 80 percent.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having five to 15 ethylene oxide radicals per molecule and eight to nine carbon atoms in the alkyl radical, lignin sulfonic acids, their alkali metal and alkaline earth metal salts, polyethylene glycol ethers (carbowaxes), fatty alcohol polyethylene glycol ethers having five to 20 ethylene oxide radicals per molecule and eight to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e., wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, tertiary acetylene glycols, dialkyl dilauryl ammonium chloride and fatty acid alkali and alkaline earth metal salts.

Suitable anti-foam agents are silicones.

The active substances are so mixed, ground, sieved and strained with the additives mentioned above that, in wettable powders, the solid particle size of from 0.02 to 0.04 and in pastes, of 0.03 is not exceeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120° and 350°C. The solvents must be practically odorless, not phytotoxic, inert to the active substances and not readily inflammable.

Furthermore, the agents according to the invention can be applied in the form of solutions. FOr this purpose the active substance or several active substances of general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents. The solutions should contain the active substances in a concentration range from 1 to 20 percent The agents described according to the invention can be mixed with other biocidally active substances or agents. Thus in order to broaden the activity spectrum the new agents may contain, for example, insecticides, fungicides, bactericides, fungistatics, bacteriostatics or nematocides, in addition to the cited compounds of the formula I. The agents according to the invention may also contain plant fertilisers, trace elements etc.

Application forms of the new substituted 2-azabicycloalkanes are described hereinbelow. Parts denote parts by weight.

Granules

The following substances are used to manufacture 5 percent granules:
  5 parts of 1-(ethylthio-thio-carbonyl)-trans-decahydroquinoline,
  0.25 parts of epichlorohydrin,
  0.25 parts of cetyl polyglycol ether,
  3.50 parts of polyethylene glycol ether (Carbowax),
  91 parts of kaolin (particle size: 0.3–0.8 mm).

The active substance is mixed with epichlorohydrin and the mixture dissolved in 6 parts of acetone, then polyethylene glycol ether and cetyl polyglycol ether are added. The resulting solution is sprayed on kaolin and then evaporated in vacuo. Similar granules are also obtained if, instead of the above mentioned active substance, e.g., 1-(ethylthiocarbonyl)-2-methyldecahydroquinoline or 1 (-ethylthio-carbonyl)-octahydroindole are used.

Wettable Powder

The following constituents are used to manufacture (a) a 50 percent, (b) a 25 percent and (c) a 10 percent wettable powder:

a. 50 parts of 1-(ethylthio-thio-carbonyl)-cis-decahydroquinoline,
  5 parts of sodium dibutylnaphthalene sulphonate,
  3 parts of naphthalenesulphonic acid/phenolsulphonic acid/formaldehyde condensate (3:2:1), ),
  20 parts of kaolin,
  22 parts of Champagne chalk;

b. 25 parts of 1-(ethylthio-thio-carbonyl)-cis-decahydroquinoline,
  5 parts of sodium oleylmethyltauride,
  2 parts of naphthalenesulphonic acid/formaldehyde/condensate,
  0.5 parts of carboxymethyl cellulose,
  5 parts of neutral potassium aluminium silicate,
  62 parts of kaolin;

c. 10 parts of 1 -(methylthio-thiocarbonyl)-trans-decahydroquinoline,
  3 parts of a mixture of the sodium salts of saturated fatty alcohol sulphates,
  5 parts of naphthalenesulphonic acid/formaldehyde condensate,
  82 parts of kaolin.

The indicated active substance is applied to the corresponding carriers (kaolin and chalk) and then these are mixed and ground, to yield wettable powders of excellent wettability and having an excellent capacity for forming suspensions. By diluting these wettable powders with water it is possible to obtain suspensions of every desired concentration of active substance. Such suspensions are used for combating weeds and weed-like grasses in cultures of water and dry rice before and after the emergence of the rice plants.

Paste

The following substances are used to manufacture a 45 percent paste:
  45 parts of an active substance of the formula I,
  5 parts of sodium aluminium silicate,
  14 parts of cetyl polyglycol ether with 8 mols of ethylene oxide,
  1 part of oelyl polyglycol ether with 5 mols of ethylene oxide,
  2 parts of spindle oil.
  10 parts of polyethylene glycol.
  23 parts of water.

The active substance is intimately mixed with the additives in appropriate devices and ground. A paste is obtained from which, by diluting it with water, it is possible to manufacture suspensions of every desired concentration of active substance. The suspensions are suitable for treating cultures of water rice before and after the emergence of the plants.

Emulsion Concentrate

To manufacture a 10 percent emulsion concentrate 10 parts of an active substance of the formula I,
  15 parts of olelyl polyglycol ether with 8 mols of ethylene oxide,
  75 parts of isophoron are mixed together. This concentrate can be diluted with water to give emulsions in desired concentrations. Such emulsions are applied, for example, to cultures of dry rice before the emergence of the rice plants.

What we claim is:

1. An azabicycloalkane of the formula I

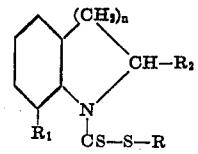

wherein R represents a $C_1-C_4$ alkyl group, a $C_3-C_4$ alkenyl group 2-chloroallyl and 3-chloroallyl; $R_1$ and $R_2$ each represents hydrogen or the one represents methyl and the other represents hydrogen, and $n$ is the number 2.

2. 1-(Allylthio-thio-carbonyl)-trans-decahydroquinoline.

3. 1-(Ethylthio-thio-carbonyl)-cis-decahydroquinoline.

* * * * *